United States Patent
Huang et al.

(10) Patent No.: US 9,590,935 B2
(45) Date of Patent: Mar. 7, 2017

(54) CROSS-CARRIER DEVICE IDENTIFICATION AND POLICY APPLICATION

(71) Applicant: Verizon Patent and Licensing Inc., Arlington, VA (US)

(72) Inventors: Ye Huang, San Ramon, CA (US); Wing-Cheong V. Yeung, San Ramon, CA (US); Priscilla Lau, Fremont, CA (US)

(73) Assignee: Verizon Patent and Licensing Inc., Basking Rdge, NJ (US)

( * ) Notice: Subject to any disclaimer, the term of this patent is extended or adjusted under 35 U.S.C. 154(b) by 533 days.

(21) Appl. No.: 14/226,477

(22) Filed: Mar. 26, 2014

(65) Prior Publication Data
US 2015/0281330 A1 Oct. 1, 2015

(51) Int. Cl.
*G06F 15/16* (2006.01)
*H04L 12/58* (2006.01)
*H04L 29/08* (2006.01)
*H04W 4/00* (2009.01)

(52) U.S. Cl.
CPC ............ *H04L 51/12* (2013.01); *H04L 67/303* (2013.01); *H04W 4/005* (2013.01)

(58) Field of Classification Search
USPC .................................................. 709/203, 217
See application file for complete search history.

(56) References Cited

U.S. PATENT DOCUMENTS

2010/0151866 A1* 6/2010 Karpov .................. H04L 51/38
455/445
2012/0129488 A1* 5/2012 Patterson .............. H04M 15/50
455/406

* cited by examiner

*Primary Examiner* — Hee Soo Kim

(57) ABSTRACT

A first server device, associated with a first carrier network, may provide a first identifier of a first application device to a second server device to cause the second server device to store the first identifier. The second server device may be accessible from the first carrier network and from a different second carrier network. The first server device may receive a first message from the first application device; transmit the first message and the first identifier of the first application device towards a client device via the first carrier network and the second carrier network; receive, from a second application device associated with the second carrier network, a second message; identify the second application device based on information, maintained by the second server, associating the second application device with the second identifier; identify a set of policies based on the second identifier; and apply the set of policies.

20 Claims, 8 Drawing Sheets

Registry Information

| MDN | Party ID | Application Type | Message Policies |
|---|---|---|---|
| 9255551212 | Customer 1 | M2M | Policy Set 1 |
| 9255551213 | Customer 2 | A2P | Policy Set 2 |
| 9255551214 | Customer 3 | M2M | Policy Set 3 |
| 9255551215 | Customer 3 | A2P | Policy Set 4 |

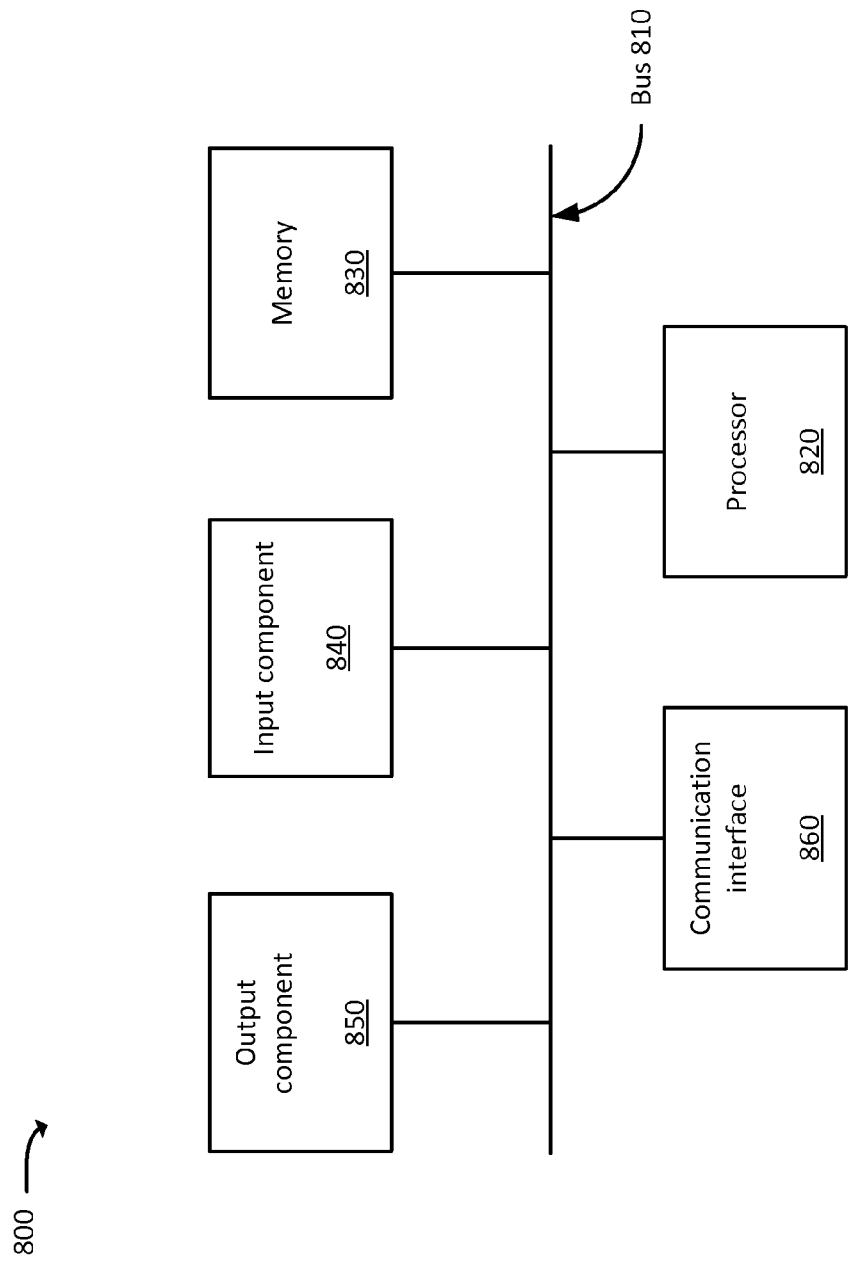

CROSS-CARRIER DEVICE IDENTIFICATION AND POLICY APPLICATION

BACKGROUND

Multiple carrier networks may be involved in the transmission of messages between client devices and application devices (e.g., Machine-to-Machine (M2M) devices, Application to Person (A2P) devices, etc.). When a message is transmitted from a sending carrier network and received by a receiving carrier network, the receiving carrier network may be unable to identify the owner of a device or application device from which the message originated. Further, the receiving carrier network may be unable to identify policies that may need to be applied to facilitate the transmission of the inter-carrier message.

BRIEF DESCRIPTION OF THE DRAWINGS

FIG. 3 illustrates an example data structure that may store registry information for multiple application devices;

FIG. 8 illustrates example components of one or more devices, according to one or more implementations described herein.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide a technique for multiple different carrier networks to identify application devices (e.g., Application to Person (A2P) devices, Machine-to-Machine (M2M) devices, etc.) when the application devices (app devices) provide messages via different carrier networks. For example, a receiving carrier network (e.g., a carrier network that receives messages destined for client devices) may identify an application device (e.g., a device that provides the messages via a different sending carrier network). The receiving carrier network may identify the application device based on a shared registry between the sending carrier network and the receiving carrier network. Based on identifying the application device, the receiving carrier network may apply policies in connection with the transmission of the messages. For example, the receiving carrier network may apply spam filters to the messages, provide alarms to the sending carrier network based on detecting a particular quantity of spam messages sent by the sending device, or perform some other function based on identifying the sending device.

Figure 1:
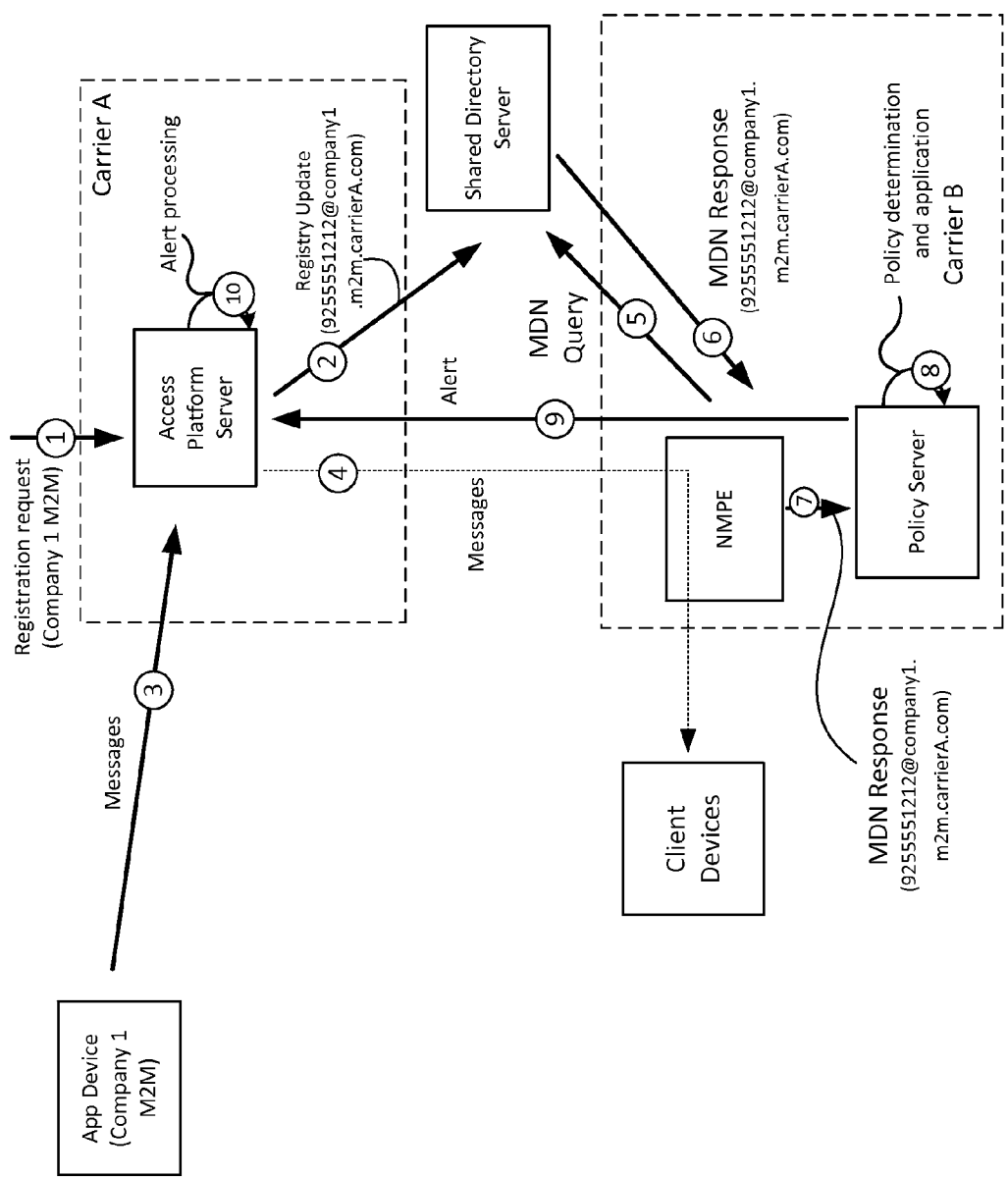
FIG. 1 illustrates an example overview of an implementation described herein.

FIG. 1 illustrates an overview of an example implementation as described herein. In FIG. 1, an access platform server, associated with a sending carrier network (e.g., carrier A), may receive a registration request (arrow 1). The registration request may identify an application implemented by a sending device (e.g. an app device) that may provide messages to client devices. The registration request may further include a party identifier associated with the app device (e.g., "Company 1"), a type of application implemented by the app device (e.g., an M2M type application), and/or an identifier of the carrier associated with the access platform server (e.g., "Carrier A").

Based on receiving the registration request, the access platform server may assign a device identifier to the app device (e.g., a mobile device number (MDN) and/or some other type of identifier). As an example, the access platform server may assign the MDN "9255551212." The access platform server may further store information associating the MDN with the app device, the party identifier (e.g. "Company 1"), the type of application implemented by the app device (e.g., an M2M type application), and/or the identifier of the carrier associated with the access platform server (e.g., "Carrier A"). As shown in FIG. 1, the access platform server may provide a registry update to a shared directory server (arrow 2). The registry update may include information identifying the MDN, the party associated with the app device, the application type, and/or the carrier ID in a particular format (e.g., "9255551212@company1.m2m.carrierA.com"). The registry update may further include information identifying a set of policies that are to be applied in connection with the transmission of messages provided by the app device. Based on receiving the registry update, the shared directory server may store the information included in the registry update.

As further shown in FIG. 1, the app device may provide messages to client devices via the access platform server and a network message processing entity (NMPE), as shown in arrows 3 and 4. The messages may include the MDN of the app device. In FIG. 1 assume that the messages are provided via carrier A, received by carrier B, and provided to the client devices via carrier B. During the transmission of the messages, the NMPE, associated with carrier B, may receive the MDN of the messages.

As shown in FIG. 1, The NMPE may provide a query to the shared directory server (arrow 5) and receive a response from the shared directory server (arrow 6). The query may include the MDN, and the response may include information identifying that the app device is a registered device. Also, the response may include information identifying policies that may be applied. For example, the response may include the MDN of the app device, a party identifier (ID) (e.g., an identifier of the sending party, such as "company1"), the application type, and/or the carrier ID. The NMPE may provide the MDN response to a policy server (arrow 7).

Based on receiving the response, the policy server may identify the app device and may determine policies to apply in connection with the transmission of the messages (arrow 8). For example, the policy server may instruct to apply particular spam filters to the messages to flag and identify "spam" messages that may correspond to possible suspicious activity associated with the app device. Based on identifying the spam messages, carrier B may provide an alert to the access platform server (arrow 9). As an example, assume that the app device is accessed by an unauthorized party, and spam messages are provided by the unauthorized party via the app device. Carrier B may identify the app device, apply spam filters to the messages to identify the messages as spam messages, and notify the access platform server that the messages, sent by the app device, have been identified as spam messages.

Based on receiving the alert, the access platform server may process the alert (arrow 10), for example, by storing and/or providing information regarding the spam messages included in the alert. In some implementations, an audit and/or some other type of analysis may be performed to determine whether the account of the app device has been compromised. In some implementations, the account of the app device may be suspended based on determining that the account has been compromised. As a result, carrier B may identify the app device when the app device sends messages, destined for client devices, via carrier A and carrier B. Based on identifying the app device, carrier B may implement policies when transmitting the messages, for example, to identify spam messages and/or possible suspicious activity while permitting the transmission of legitimate messages (e.g., messages not identified as spam messages). Additionally, or alternatively, carrier A and/or carrier B may perform some other task or implement some other type of policy based on identifying the app device.

Figure 2:
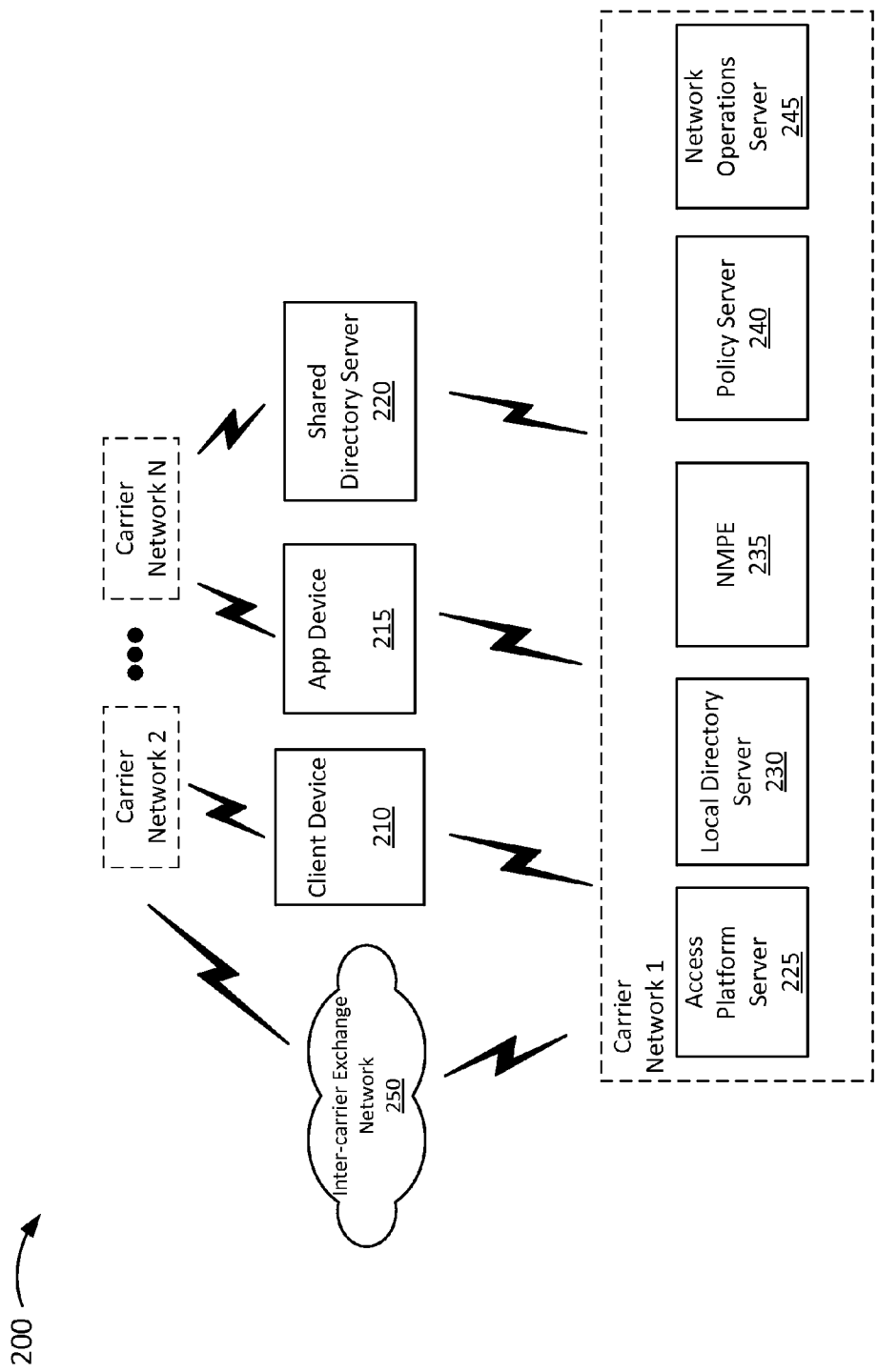
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include client devices 210, app device 215, shared directory server 220, access platform server 225, local directory server 230, policy server 240, network operations server 245, and inter-carrier exchange network 250.

As shown in FIG. 2, environment 200 may include carrier networks 1 through N (where N is ≥1). Each carrier network may include access platform server 225, local directory server 230, NMPE 235, policy server 240, and network operations server 245. Each carrier network may also include a network core (not shown) to transmit and/or receive data within the corresponding carrier network. Each carrier network may include one or more wired and/or wireless networks. For example, each carrier network may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, each carrier network may include a local area network (LAN), a wide area network (WAN), a metropolitan network (MAN), the Public Switched Telephone Network (PSTN), an ad hoc network, a managed Internet Protocol (IP network, a virtual private network (VPN), an intranet, the Internet, a fiber optic-based network, and/or a combination of these or other types of networks.

Client device 210 may include a device capable of communicating via a network, such as a carrier network. For example, client device 210 may correspond to a mobile communication device (e.g., a smart phone or a personal digital assistant (PDA)), a portable computer device (e.g., a laptop or a tablet computer), a gaming device, a set-top box, or the like. Additionally, or alternatively, client device 210 may correspond to an M2M device, an A2P device, etc. In some implementations, client device 210 may receive messages generated by app device 215. For example, client device 210 may receive messages corresponding to alerts generated by app device 215 (e.g., alerts identifying the occurrence of an event). Additionally, or alternatively (e.g., when client device 210 is an M2M device), the messages may include instructions to cause client device 210 to perform a task (e.g., execute a command, adjust a sensor, trigger a switch, etc.) or may include data sensed by the M2M device (e.g., a temperature value, humidity value, image taken by the M2M device, etc.).

App device 215 may include a computing device, or a group of computing devices. In some implementations, app device 215 may provide control instructions to client device 210 (e.g., based on information received from client device 210). App device 215 may communicate with multiple carrier networks and/or other types of networks.

In some implementations, app device 215 may include an application to process raw data gathered by the one or more sensors. In some implementations, app device 215 may include an application that provides a message to client device 210 based on the raw data. For example, app device 215 may provide a message identifying the occurrence of a particular event (e.g., when motion is detected, when temperature measurement satisfies a particular threshold, when a switch or actuator is set to a particular position, etc.) to alert a user of client device 210 regarding the occurrence of the particular event or a message including the raw data. In some implementations, app device 215 may provide a message including a control instruction to an M2M client device 210.

Shared directory server 220 may include one or more computing devices, such as a server device or a collection of server devices. In some implementations, shared directory server 220 may receive a registry update from access platform server 225. In some implementations, the registry update may include information identifying app device 215, a party ID (e.g., an ID of a company, organization, or group associated with app device 215), a type of application implemented by app device 215, a carrier ID associated with app device 215, and/or some other information. Additionally, the registry update may include policies that are to be applied when transmitting messages from app device 215 to client device 210. In some implementations, shared directory server 220 may provide the registry information to respective local directory servers 230 for multiple carrier networks such that the local directory servers 230 store the same registry information.

Access platform server 225 may include one or more computing devices, such as a server device or a collection of server devices. In some implementations, access platform server 225 may provide messages to client device 210 on behalf of app device 215. Access platform server 225 may receive a registration request from app device 215, authorize app device 215 to provide messages via access platform server 225, assign an identifier to app device 215 (e.g., an MDN and/or some other type of identifier), and register an account to app device 215. Access platform server 225 may provide a registry update to shared directory server 220 based on authorizing app device 215 and assigning the identifier. In some implementations, access platform server 225 may receive messages from app device 215 and destined for client device 210. For example, app device 215 may include account information with the messages. Access platform server 225 may authenticate the account information, and forward the message (e.g., from a first (sending) carrier network with which access platform server is associated) to client device 210 (e.g., a client device attached to a second (receiving or terminating) carrier network. When providing the message, access platform server 225 may also provide the MDN of app device 215 to permit policy server 240 of the receiving carrier network to identify app device 215.

Local directory server 230 may include one or more computing devices, such as a server device or a collection of server devices. In some implementations, local directory server 230 may store a list of available MDNs (or other types of identifiers) that are available for use by app device 215. Local directory server 230 may provide an available MDN to access platform server 225 so that access platform server 225 may assign the MDN to app device 215 (e.g., as part of a registration request). Local directory server 230 may receive registry updates from shared directory server 220, receive an MDN query from policy server 240, and provide a response to the MDN query.

NMPE 235 may include one or more computing devices, such as a server device or a collection of server devices. In some implementations, NMPE 235 may process a message received from a different carrier network. When processing the message, NMPE 235 may receive an MDN of the message, identify excess messaging associated with the MDN, provide an MDN query to shared directory server 220, and receive an MDN response. NMPE 235 may provide some or all of the MDN response to policy server 240, to permit policy server 240 to identify a particular app device 215, and policies to apply to the transmission of the message.

Policy server 240 may include one or more computing devices, such as a server device or a collection of server devices. In some implementations, policy server 240 may receive information identifying an MDN when a message is transmitted via a carrier network associated with policy server 240. In some implementations, policy server 240 may identify app device 215 based on the MDN, and may implement particular policies during the transmission of the message based on the MDN. In some implementations, policy server 240 may communicate with local directory server 230 and/or shared directory server 220 to identify app device 215 and/or the policies to be implemented.

Network operations server 245 may include one or more computing devices, such as a server device or a collection of server devices. In some implementations, network operations server 245, associated with a sending carrier network, may receive information (e.g. from a receiving carrier network) regarding suspicious activity, flagged messages (e.g., messages identified as spam), etc. In some implementations, the information regarding the suspicious activity and/or flagged messages may be analyzed to determine whether an account of app device 215, used to provide the messages, has been compromised.

Inter-carrier exchange network 250 may include one or more wired and/or wireless networks that may link multiple carrier networks. For example, inter-carrier exchange network 250 may include a cellular network, a PLMN, a LAN, a WAN, a MAN, the PSTN, an ad hoc network, a managed IP network, a VPN, an intranet, the Internet, a fiber optic-based network, and/or a combination of these or other types of networks. In some implementations, inter-carrier exchange network may not include an actual network, but may merely represent one or more devices (either within carrier networks or external to the carrier networks) that provide for inter-carrier communications.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections. Additionally, various devices were referred to as a "server" herein. A server, as used herein, may include a single computing device, clusters of computing devices (e.g., blades or rack-mounted server computers) that are co-located or geographically distributed, cloud-based (e.g., computing as a service) computing solutions, or other arrangements of computing devices.

FIG. 3 illustrates an example data structure 300 that may store registry information for app devices. In some implementations, data structure 300 may be stored in a memory of shared directory server 220 and/or local directory server 230. In some implementations, data structure 300 may be stored in a memory separate from, but accessible by, shared directory server 220 and/or local directory server 230 (e.g., a "cloud" storage device). In some implementations, data structure 300 may be stored by some other device in environment 200, such as app device 215, access platform server 225, NMPE 235, policy server 240, and/or network operations server 245. A particular instance of data structure 300 may contain different information and/or fields than another instance of data structure 300. Information included in data structure 300 may be based on registry information received from access platform server 225.

As shown in FIG. 3, each entry in data structure 300 may identify an MDN (or other identifier of a particular app device 215), a party ID (e.g., an ID of a party associated with the particular app device 215), an application type (e.g., a type of application implemented by the particular app device 215), and a set of message policies to be applied when transmitting messages originated from the particular app device 215. The MDN may correspond to the MDN assigned to the particular app device 215 (e.g., by access platform server 225). The party ID, application type, and message policies may correspond to information included in a registration request received by access platform server 225. In some implementations, the message policies may include spam filters or identifications of spam filters that are to be applied to the messages. Additionally, or alternatively, the message policies may identify a threshold number of messages that may be sent by app device 215 before subsequent messages are flagged as spam messages. Additionally, or alternatively, the message policies may include some other policy that may be implemented by policy server 240.

As described in greater detail below, NMPE 235 may provide a query to shared directory server 220 and/or local directory server 230. The query may include an MDN associated with a message provided by app device 215 and destined for client device 210. Based on receiving the query, shared directory server 220 and/or local directory server 230 may look up the MDN in data structure 300 to determine whether the app device 215 is authorized to provide messages. Further, shared directory server 220 and/or local directory server 230 may look up the MDN to determine a particular set of policies that policy server 240 may implement during the transmission of the message. If the MDN in the query is not included in data structure 300, shared directory server 220 and/or local directory server 230 may determine that app device 215 is not authorized to provide the message. Alternatively, shared directory server 220 and/or local directory server 230 may identify a default set of policies to be implemented if the MDN is not included in data structure 300.

While particular fields are shown in a particular format in data structure 300, in practice, data structure 300 may include additional fields, fewer fields, different fields, or differently arranged fields than are shown in FIG. 3. Also, FIG. 3 illustrates examples of information stored by data structure 300. In practice, other examples of information stored by data structure 300 are possible.

Figure 4:
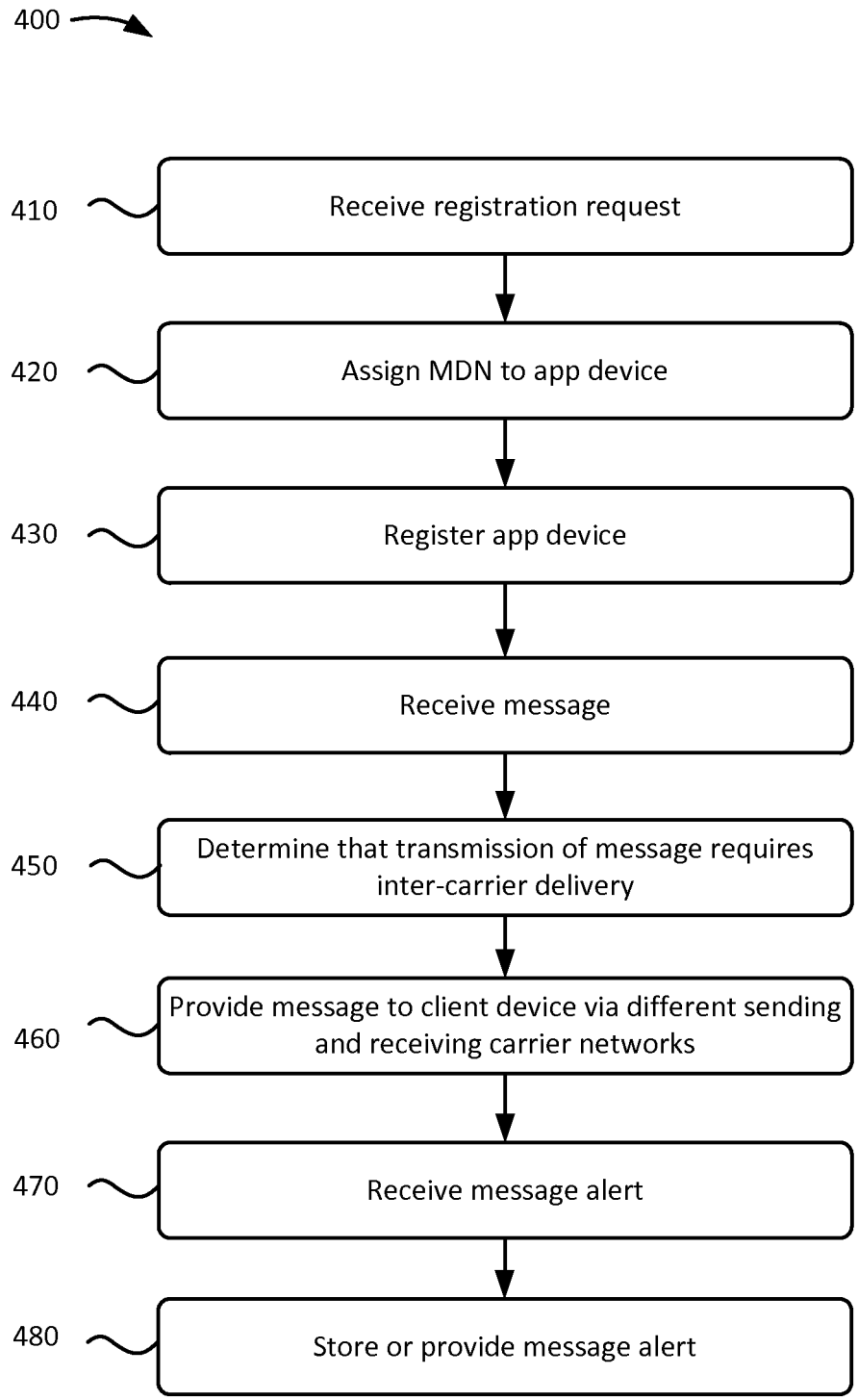
FIG. 4 illustrates a flowchart of an example process for registering an account with an application device and storing or providing message alerts associated with the application device.

FIG. 4 illustrates a flowchart of an example process 400 for registering an account with an app device and storing or providing messages associated with the app device. In some implementations, process 400 may be performed by one or more components of access platform server 225. In another implementation, some or all of blocks of process 400 may be performed by one or more components of another device in environment 200 (e.g., app device 215, shared directory server 220, local directory server 230, NMPE 235, policy server 240, or network operations server 245), or a group of devices including or excluding access platform server 225.

As shown in FIG. 4, process 400 may include receiving a registration request (block 410). For example, access platform server 225 may receive the registration request via a user interface associated with access platform server 225. In some implementations, an operator may input the registration request via the user interface (e.g., a web portal, or some other type of interface). The registration request may include an identifier of an app device 215, and a request to register an account for app device 215 with access platform server 225. Once the account is registered (as described in greater detail below), app device 215 may direct access platform server 225 to provide messages to one or more client devices 210 on behalf of app device 215. In some implementations, the registration request may further include a party ID, information identifying an application type, and/or some other information. In some implementations, the registration request may further include a set of transmission policies to be implemented when transmitting messages from app device 215 to client devices 210.

In some implementations, access platform server 225 may authorize app device 215 based on receiving the registration request. For example, access platform server 225 may provide an authorization message to an administrator or operator of app device 215 to authenticate that the registration request was authorized by an authorizing party associated with app device 215. Additionally, or alternatively, access platform server 225 may authorize app device 215 based on some other technique.

Process 400 may also include assigning an MDN to the app device (block 420). For example, access platform server 225 may assign the MDN based on receiving the registration request. In some implementations, access platform server 225 may assign the MDN further based on authorizing app device 215 as described above. In some implementations, access platform server 225 may communicate with local directory server 230 to determine an available MDN that may be assigned to app device 215. As described above, local directory server 230 may store a list of available MDNs for an associated carrier network. Based on determining the available MDN, access platform server 225 may assign the MDN to app device 215. Further, access platform server 225 may generate an account for app device 215 and associate authorization credentials with the account. As described in greater detail below, app device 215 may provide the authorization credentials to communicate with access platform server 225, and as part of a request to send a message to client device 210.

In some implementations, access platform server 225 may assign an MDN to app device 215 using some other technique. For example, access platform server 225 may assign the MDN without communicating with local directory server 230. In some implementations, access platform server 225 may assign the MDN based on a serial number, an international mobile equipment identifier (IMEI), and/or some other information associated with app device 215. In some implementations, block 420 may be omitted, for example, when app device 215 was previously assigned an MDN and/or when app device 215 stores an associated MDN.

Process 400 may further include generating and providing registration of the app device (block 430). For example, access platform server 225 may register the app device by generating a registry update based on assigning the MDN. In some implementations, the registry update may include an instruction to direct local directory server 230 to store information associating app device 215 with the MDN, the party ID, the app type, and a carrier ID of the carrier network associated with access platform server 225. The registry update may also include a set of policies to be implemented during the transmission of messages from access platform server 225. In some implementations, information in the registry update may correspond to information stored by data structure 300. Access platform server 225 may provide the registry update to shared directory server 220. Based on receiving the registry update, shared directory server 220 may provide the registry update to respective local directory servers 230 associated with multiple carrier networks. The respective local directory servers 230 may each store information included in the registry update.

Process 400 may also include receiving a message (block 440). For example, access platform server 225 may receive a message from app device 215. The message may include an alert, a control instruction, and/or some other type of message generated by app device 215. The message may also include information identifying a recipient client device 210 (e.g., an address of client device 210, an MDN of client device 210, etc.). In some implementations, app device 215 may provide authorization credentials when transmitting the message. The authorization credentials may be used by access platform server 225 to identify app device 215 and authorize the transmission of the message. Access platform server 225 may authorize the transmission of the message based on the authentication credentials.

Process 400 may also include determining that the transmission of the message requires inter-carrier delivery (block 450). For example, access platform server 225 may determine that the transmission of the message requires inter-carrier delivery when the recipient of the message (e.g., client device 210) is associated with a different carrier network (e.g., a receiving carrier network) than the carrier network of access platform server 225 (e.g., a sending carrier network). In some implementations, access platform server 225 may determine that the transmission of the message requires inter-carrier delivery when the address or MDN of client device 210 is not associated with the sending carrier network (e.g., based on information stored by local directory server 230 of the sending carrier network). Additionally, or alternatively, access platform server 225 may determine that the transmission of the message requires inter-carrier delivery based on some other technique.

Process 400 may further include providing the message to the client device via different sending and receiving carrier networks (block 460). For example, access platform server 225 may provide the message via a network core associated with the sending carrier network, and the network core of the receiving carrier network may receive the message. In some implementations, access platform server 225 may provide an MDN of app device 215 when transmitting the message. In some implementations, NMPE 235, associated with the receiving carrier network, may receive an indication of the message transmission, and may receive the MDN of app device 215 when the receiving carrier network receives the message.

In some implementations, NMPE 235 may provide a query, including the MDN, to local directory server 230. Based on receiving the query, local directory server 230 may provide a query response that identifies app device 215 and a policy set associated with messages transmitted by app device 215. In some implementations, NMPE 235 may provide the query response to policy server 240, and policy server 240 may implement the identified policies. For example, policy server 240 may apply spam filters to the message, block the transmission of the message based on the spam filters, or implement some other policy. In some implementations, policy server 240 may generate an alert identifying that the message has been flagged as spam (e.g., if the spam filters have identified the message as spam).

In some implementations, NMPE 235 may query shared directory server 220 at any time the MDN is received as part of a message transmission. For example, NMPE 235 may provide the query each time a message is transmitted via the receiving carrier network of NMPE 235. Alternatively, NMPE 235 may provide the query after a particular threshold number of messages have been transmitted within a particular period of time. That is, NMPE 235 may provide the query after identifying that an excessive number of messages (e.g., a number of messages exceeding a particular threshold) have been transmitted by app device 215. Policy server 240 may then receive the query response via NMPE 235, and implement corresponding policies.

In some implementations, the excessive number of messages, sent by app device 215, may indicate possible suspicious activity in which policies should be implemented in order to determine whether the account and/or authorization credentials of app device 215 should be suspended. For example, policy server 240 may begin to apply spam filters when greater than a threshold number of messages have been transmitted by app device 215 within a particular period of time. Policy server 240 may then generate alerts identifying messages flagged as spam, and provide the alert to access platform server 225. In some implementations, policy server 240 may block the transmission of spam messages. Additionally, or alternatively, policy server 240 may permit the transmission of the spam messages, but may generate an alert to notify an operator of access platform server 225 regarding the identified spam messages.

Process 400 may further include receiving a message alert (block 470). For example, access platform server 225 may receive the message alert from policy server 240, associated with the receiving carrier, when the NMPE 235 of the receiving carrier detects excessive messaging activity. As described above, the message alert may identify messages flagged as spam by policy server 240 (e.g., based on spam filters associated with the MDN of app device 215). Additionally, or alternatively, the message alert may identify that greater than a threshold number of messages have been sent by app device 215 within a particular period of time. Additionally, or alternatively, the message alert may identify the status of particular messages. For example, the message alert may identify that particular messages have not been transmitted to client device 210 if the particular messages were flagged as spam (e.g., marked as spam by either policy server 240 of a sending carrier network or policy server 240 of the receiving carrier network). Additionally, or alternatively, the message alert may include some other type of notification regarding messages sent by app device 215.

Process 400 may also include storing or providing the message alert (block 480). For example, access platform server 225 may store the message alert or provide the message alert to network operations server 245 for storage. Once the message alert has been stored, an operator may access the message alert and use the message alert as part of an analysis to determine whether the account of app device 215 has been compromised and should be suspended. Additionally, or alternatively, the operator may access the message alert to audit messages that were identified as spam by policy server 240. For example, the operator may unflag particular messages as spam based on the audit.

In some implementations, the message alert may be used to implement policies for messages received at the sending carrier network. For example, a policy server 240, associated with the sending carrier network, may identify messages included in the message alert, and may determine how to process or dispose of the messages (e.g., based on attributes of the messages, etc.). In some implementations, the policy server 240, associated with the sending carrier network, may direct access platform server 225 to resend messages that were not delivered, discard messages, or perform some other task in order to disposition the messages.

Figure 5:
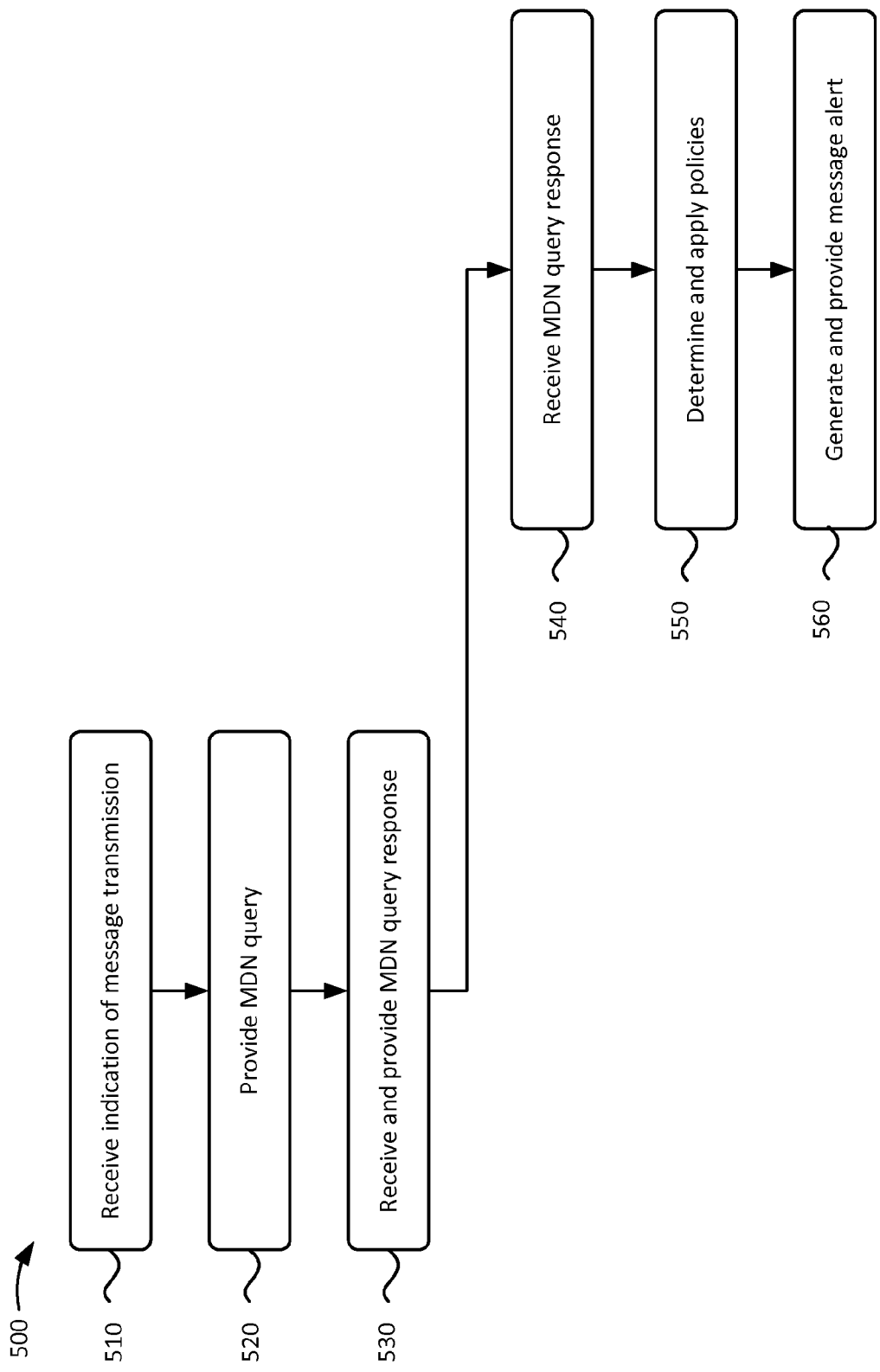
FIG. 5 illustrates a flowchart of an example process for identifying an application device that transmitted a message via multiple carrier networks.

FIG. 5 illustrates a flowchart of an example process 500 for identifying an app device that transmitted a message, applying policies in connection with the transmission of the message, and generating a message alert. In some implementations, process 500 may be performed by one or more components of NMPE 235 and/or policy server 240. In another implementation, some or all of blocks of process 500 may be performed by one or more components of another device in environment 200 (e.g., app device 215, shared directory server 220, access platform server 225, local directory server 230, or network operations server 245), or a group of devices including or excluding NMPE 235 and/or policy server 240.

As shown in FIG. 5, process 500 may include receiving an indication of a message transmission (block 510). For example, receiving carrier network along NMPE 235 may receive an indication of a message transmitted by access platform server 225 (e.g., on behalf of app device 215) via a first carrier network (e.g., a sending carrier network) and a second different carrier network associated with NMPE 235 (e.g., a receiving carrier network). The indication may include an MDN and/or some other identifier associated with app device 215.

Process 500 may also include providing an MDN query (block 520). For example, NMPE 235 may provide the MDN query to local directory server 230. In some implementations, NMPE 235 may provide the MDN query when the indication of the message has been received. In some implementations, NMPE 235 may provide the MDN query when NMPE 235 receives message transmission indications identifying a particular MDN greater than a threshold number of times (e.g., indicating excessive message transmission activity from the particular app device 215 associated with the particular MDN). In some implementations, the MDN query may include the MDN identified in the message transmission indication. Additionally, the MDN query may include a request to receive information identifying app device 215 and information identifying a set of policies to apply for the transmission of messages provided by app device 215.

Process 500 may further include receiving and providing an MDN query response (block 530). For example, NMPE 235 may receive the MDN query response from local directory server 230. In some implementations, the MDN query response may include information identifying app device 215. For example, the MDN querying response may include a party ID, an application type, a carrier ID, and/or some other information identifying app device 215. In some implementations, the MDN query response may not identify the party ID, application type, etc. (e.g., if app device 215 is not registered with access platform server 225). NMPE 235 may then provide some or all of the MDN query response to policy server 240.

Process 500 may also include receiving the MDN query response (block 540). For example, policy server 240 may receive the MDN query response from NMPE 235 when NMPE 235 receives the MDN query response from shared directory server 220.

Process 500 may also include determining and applying policies (block 550). For example, policy server 240 may determine and apply the policies. In some implementations, policy server 240 may determine the policies based on the MDN response. For example, the MDN response may include the set of policies. Additionally, or alternatively, policy server 240 may determine the set of policies based on the party ID, the application type, the carrier ID, and/or some other information identifying app device 215. For example, policy server 240 may store policy sets that are mapped to particular app devices 215. Additionally, or alternatively, policy server 240 may communicate with some other device that may store policy sets that are mapped to particular app devices 215. Based on determining the policies, policy server 240 may apply the policies in connection with the transmission of messages originated from app device 215. For example, as described above, app device 215 may block the transmission of particular messages having particular attributes, apply spam filters to the messages, or apply some other policy. Additionally, or alternatively, app device 215 may add the MDN to a whitelist so that subsequent messages, associated with the MDN, are transmitted without applying filters. If the MDN query response indicates that app device 215 is not registered with access platform server 225, policy server 240 may determine an implement a default set of policies.

Process 500 may further include generating and providing a message alert (block 560). For example, policy server 240 may generate a message alert based on applying policies as described above. In some implementations, the message alert may identify messages flagged as spam by policy server 240 (e.g., based on spam filters associated with the MDN of app device 215). Additionally, or alternatively, the message alert may identify that greater than a threshold number of messages have been sent by app device 215 within a particular period of time. Additionally, or alternatively, the message alert may identify the status of particular messages. For example, the message alert may identify that particular messages have not been transmitted to client device 210 if the particular messages were flagged as spam. Additionally, or alternatively, the message alert may include some other type of notification regarding messages sent by app device 215. Policy server 240 may provide the message alert to access platform server 225 of the sending carrier.

As described above, access platform server 225 may store the message alert or provide the message alert to network operations server 245 for storage. Once the message alert been stored, an operator may access the message alert and use the message alert as part of an analysis to determine whether the account of app device 215 has been compromised should be suspended. Additionally, or alternatively, the operator may access the message alert to audit messages that were identified as spam by policy server 240. For example, the operator may unflag particular messages as spam based on the audit.

Figure 6:
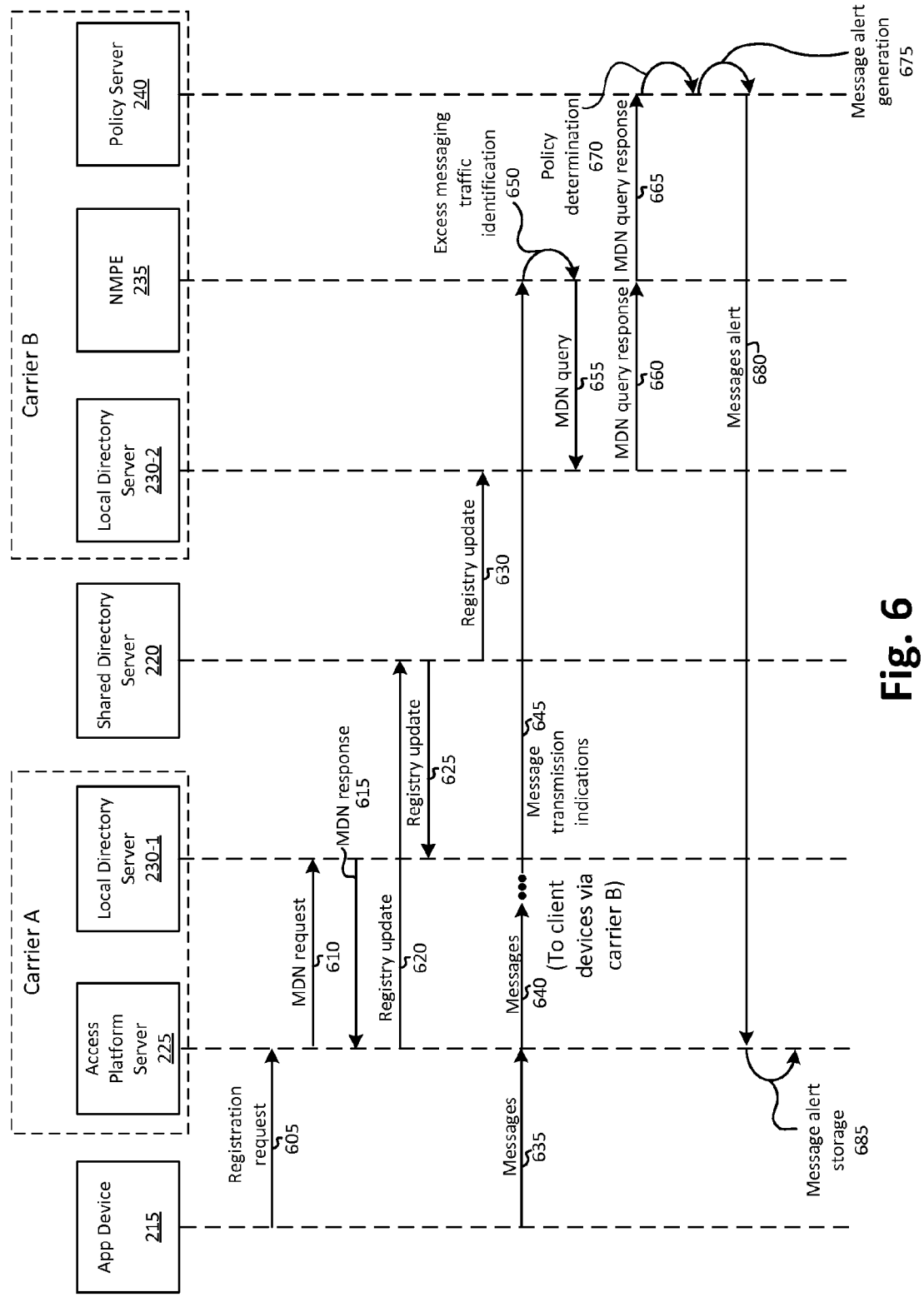
FIG. 6 illustrates a signal flow diagram of example operations for identifying an application device, and implementing transmission policies for messages provided by an access platform server on behalf of the application device.

FIG. 6 illustrates a signal flow diagram of example operations for identifying an app device, and implementing transmission policies for messages provided by an access platform server on behalf of the app device. In FIG. 6, access platform server 225, shared directory server 220, and a first local directory server 230 (e.g., local directory server 230-1) are associated with a carrier network (e.g., carrier A). A second local directory server 230 (e.g., local directory server 230-2) and policy server 240 are associated with a different carrier network (e.g., carrier B).

As shown in FIG. 6, access platform server 225 may receive a registration request (at 605). For example, access platform server 225 may receive the registration request from app device 215. Alternatively, access platform server 225 may receive the registration request independently of app device 215.

The registration request may include an identifier of app device 215, and a request to register an account for app device 215 with access platform server 225. Once the account is registered (e.g., as described in greater detail below), app device 215 may direct access platform server 225 to provide messages to one or more client devices 210 on behalf of app device 215.

As further shown in FIG. 6, access platform server 225 may provide an MDN request (at 610) to local directory server 230-1. The MDN request may direct local directory server 230-1 to provide an available MDN that may be assigned to app device 215. Based on receiving the MDN request, local directory server 230-1 may provide an MDN response identifying an available MDN that may be assigned to app device 215.

Based on receiving the MDN response, access platform server 225 may assign the MDN to app device 215. Further, access platform server 225 may generate an account for app device 215 and associate authorization credentials with the account. Based on generating the account for app device 215, access platform server 225 may generate a registry update. In some implementations, the registry update may include an instruction to direct local directory server 230 to store information associating app device 215 with the MDN, the party ID, the app type, and a carrier ID of the carrier network associated with access platform server 225. The registry update may also include a set of policies to be implemented during the transmission of messages from access platform server 225. In some implementations, information in the registry update may correspond to information stored by data structure 300. Access platform server 225 may provide the registry update to local directory server 230 (at 620). Based on receiving the registry update, shared directory server 220 may provide the registry update (at 625 and 630) to respective local directory servers 230 (e.g., local directory server 230-1 and local directory server 230-2) associated with multiple carrier networks (e.g., carrier A and carrier B). The respective local directory servers 230 may each store information included in the registry update.

As further shown in FIG. 6, app device 215 may provide messages destined for client devices 210 (at 635). Based on receiving the messages, access platform server 225 transmit the messages to client devices (at 640). In FIG. 6, assume that messages are transmitted by access platform server 225 to client devices 210 via carrier A and carrier B. Given this assumption, NMPE 235 may receive message transmission indications (at 645). Each message transmission indication may include the MDN of app device 215 and indication that access platform server 225 has transmitted a message on behalf of app device 215.

In some implementations, NMPE 235 may identify excess messaging traffic associated with the MDN of app device 215 (at arrow 650). For example, NMPE 235 may identify the excess messaging traffic when NMPE 235 receives message transmission indications identifying a particular MDN greater than a threshold number of times. Based on identifying the excess messaging traffic, NMPE 235 may provide an MDN query to local directory server 230-2 (at 655). Additionally, or alternatively, NMPE 235 may provide the MDN query at any time, regardless of identifying excess messaging traffic. In some implementations, the MDN query may include the MDN identified in the message transmission indication. Additionally, the MDN query may include a request to receive information identifying app device 215 and information identifying a set of policies to apply for the transmission of messages provided by app device 215.

Based on receiving the MDN query, local directory server 230-2 may look up the MDN in a registry stored by local directory server 230-2 and provide an MDN query response (at 660). In some implementations, the MDN query response may include information identifying app device 215. For example, the MDN querying response may include a party ID, an application type, a carrier ID, and/or some other information identifying app device 215. In some implementations, the MDN query response may not identify the party ID, application type, etc. (e.g., if app device 215 is not registered with access platform server 225). NMPE 235 may provide some or all of the MDN query response to policy server 240 (at 665).

Based on receiving the MDN query response, policy server 240 may determine a set of policies to implement in connection with the transmission of messages associated with the MDN of app device 215 (at 670). For example, the MDN response may include the set of policies. Additionally, or alternatively, policy server 240 may determine the set of policies based on the party ID, the application type, the carrier ID, and/or some other information identifying app device 215. Based on determining the policies, policy server 240 may apply the policies in connection with the transmission of messages originated from app device 215. For example, as described above, app device 215 may block the transmission of particular messages having particular attributes, apply spam filters to the messages, or apply some other policy. Additionally, or alternatively, app device 215 may add the MDN to a whitelist so that subsequent messages, associated with the MDN, are transmitted without applying filters. If the MDN query response indicates that app device 215 is not registered with access platform server 225, policy server 240 may determine an implement a default set of policies.

In some implementations, policy server 240 may generate a message alert (at 675). For example, policy server 240 may generate a message alert based on applying policies as described above. In some implementations, the message alert may identify messages flagged as spam by policy server 240 (e.g., based on spam filters associated with the MDN of app device 215). Additionally, or alternatively, the message alert may identify that greater than a threshold number of messages have been sent by app device 215 within a particular period of time. Additionally, or alternatively, the message alert may identify the status of particular messages. For example, the message alert may identify that particular messages have not been transmitted to client device 210 if the particular messages were flagged as spam. Additionally, or alternatively, the message alert may include some other type of notification regarding messages sent by app device 215. Policy server 240 may provide the message alert to access platform server 225.

Policy server 240 may provide the message alert to access platform server 225 (at 680), and access platform server 225 may store the message alert (at 685). Additionally, or alternatively, access platform server 225 may provide the message alert to network operations server 245 for storage. Once the message alert been stored, an operator may access the message alert and use the message alert as part of an analysis to determine whether the account of app device 215 has been compromised should be suspended. Additionally, or alternatively, the operator may access the message alert to audit messages that were identified as spam by policy server 240. For example, the operator may unflag particular messages as spam based on the audit.

Figure 7:
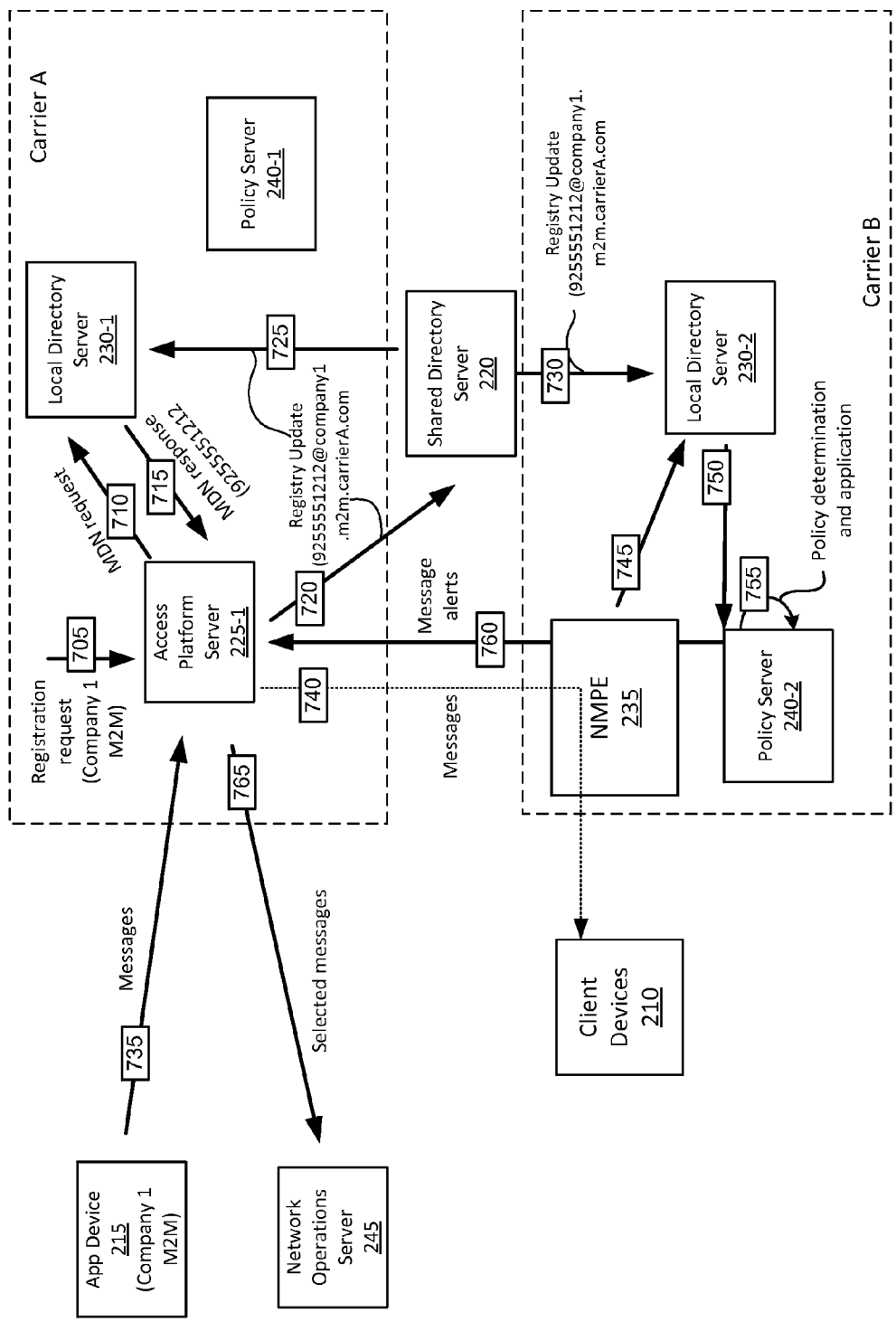
FIG. 7 illustrates an example implementation for identifying an application device, and implementing transmission policies for messages provided by an access platform server on behalf of the application device.

FIG. 7 illustrates an example implementation for identifying an app device, and implementing transmission policies for messages provided by an access platform server on behalf of the app device. In FIG. 7, access platform server 225-1, local directory server 230-1, and policy server 240-1 may be associated with a first carrier network (e.g., carrier A). Access platform server 225-2, local directory server 230-2, and policy server 240-2 may be associated with a second carrier network (e.g., carrier B).

As shown in FIG. 7, access platform server 225-1 may receive a registration request (arrow 705). In an example shown in FIG. 7, the registration request may include the company ID "Company 1" and the application type "M2M." Based on receiving the registration request, access platform server 225-1 may provide an MDN request (arrow 710) to local directory server 230-1. Local directory server 230-1 may provide an MDN response (arrow 715) identifying an available MDN that may be assigned to app device 215. In the example shown in FIG. 7, local directory server 230-1 may provide the MDN "9255551212" as part of the MDN response.

Based on receiving the MDN response, access platform server 225-1 may assign the MDN to app device 215, generate an account for app device, and generate a registry update. Access platform server 225-1 may provide the registry update to shared directory server 220 (arrow 720).

In some implementations, the registry update may be in the format "MDN@partyID.application_type.carrierID.com." In the example shown in FIG. 7, the registry update may be provided as "9255551212@company1.m2m.carrierID.com." Shared directory server 220 may store the registry update, and provide the registry update to local directory server 230-1 and local directory server 230-2 (arrows 725 and 730) so that local directory server 230-1 and local directory server 230-2 each store the same registry information. Also, local directory server 230-1 and local directory server 230-2 may each store the registry information so that policy server 240 may communicate locally within an associated carrier network to provide and receive MDN query and MDN query responses without involving shared directory server 220.

As further shown in FIG. 7, app device 215 may provide messages to access platform server 225-1 (arrow 735). Access platform server 225-1 may provide the messages to client devices 210 via carrier A and carrier B (arrow 740). In some implementations, NMPE 235 may receive message indications as the messages are transmitted to client devices 210. In some implementations, NMPE 235 may identify excessive messaging traffic from app device 215, and temporarily suspend the transmission of messages to client devices 210. Further, NMPE 235 may provide an MDN query to local directory server 230-2 (arrow 745). Local directory server 230-2 may provide an MDN query response to NMPE 235, or alternatively, provide the MDN query response to policy server 240-2 without involving NMPE 235 (arrow 750). Based on receiving the MDN query response, policy server 240-2 may determine and apply transmission policies based on the MDN query response (arrow 755). Policy server 240-2 may then generate message alerts, and provide the message alerts to access platform server 225-1.

Access platform server 225-1 may store the message alerts, and select a group of messages that may be audited and/or analyzed. For example, access platform server 225-1 may select the messages based on attributes of the messages (e.g., message content, message type, message recipients, etc.). Access platform server 225-1 may provide the selected messages to network operations server 245 such that the selected messages may be audited and analyzed. Based on the analysis of the selected messages, access platform server 225-1 may receive an instruction to suspend the account of app device 215. Additionally, or alternatively, access platform server 225-1 may receive an instruction to direct policy server 240-2 to transmit particular messages that were flagged as spam, but were determined to be not spam (e.g., based on the audit and/or analysis).

While a particular example is shown in FIG. 7, the above description is merely an example implementation. In practice, other examples are possible from what is described above in FIG. 7.

FIG. 8 is a diagram of example components of device 800. One or more of the devices described above (e.g., with respect to FIGS. 1, 2, 6, and 7) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks and/or signal flows have been described with regard to FIGS. 4-6 the order of the blocks and/or signal flows may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 2A, 2B, and 3), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater that" similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   providing, by a first server device associated with a first carrier network, a first identifier of a first application device to a second server device to cause the second server device to store information associating the first application device with the first identifier, the first identifier, stored by the second server device, being accessible from the first carrier network and from a different second carrier network;
   receiving, by the first server device, a first message from the first application device and destined for a client device;
   transmitting, by the first server device, the first message and the identifier of the first application device towards the client device via the first carrier network and the second carrier network;
   receiving, by the first server device and from a second application device associated with the second carrier network, a second message, the second message being associated with a second identifier;
   identifying, by the first server device, the second application device based on information associating the second application device with the second identifier, the information associating the second application device with the second identifier being maintained by the second server;
   identifying, by the first server device and based on identifying the second application device, a set of policies to apply in connection with the transmission of the second message; and
   applying, by the first server device, the set of policies.

2. The method of claim 1, further comprising:
   receiving a request to register the first application device with the first server device to permit the first application device to access the first server device and provide the first message to the client device via the first server device,
   wherein providing the first identifier is based on receiving the request to register the first application device with the first server device.

3. The method of claim 1, wherein identifying the set of policies includes identifying the set of policies based on information stored by the second server device associating the second identifier with the set of policies.

4. The method of claim 1, wherein the first and second application devices include a Machine-to-Machine device or an Application to Person device.

5. The method of claim 1, wherein applying the set of policies includes at least one of:
   applying a spam filter to the message,
   blocking the transmission of the message, or
   generating a notification regarding the message.

6. The method of claim 1, further comprising:
   receiving the second identifier each time a message is provided by the second application device,
   wherein identifying the set of policies is based on receiving the second identifier greater than a threshold number of times.

7. The method of claim 1, further comprising: receiving, from a third server, a notification regarding the transmission of the first message; and storing or outputting the notification.

8. The method of claim 1, further comprising:
   determining that the first identifier is available to be assigned to the first application device; and
   assigning the first identifier to the first application device based on determining that the identifier is available,
   wherein providing the first identifier is based on assigning the first identifier.

9. A system comprising: a first server device, associated with a first carrier network, comprising:
   a non-transitory memory device storing a plurality of processor-executable instructions; and a processor configured to execute the processor-executable instructions, wherein executing the processor-executable instructions causes the processor to:
   provide a first identifier of a first application device to a second server device to cause the second server device to store information associating the first application device with the first identifier, the first identifier, stored by the second server device, being accessible from the first carrier network and from a different second carrier network;
   receive a first message from the first application device and destined for a client device;
   transmit the first message and the first identifier of the first application device towards the client device via the first carrier network and the second carrier network;
   receive, from a second application device associated with the second carrier network, a second message;
   identify the second application device based on information associating the second application device with the second identifier, the information associating the second application device with the second identifier being maintained by the second server;
   identify, based on identifying the second application device, a set of policies to apply in connection with the transmission of the second message; and
   apply the set of policies.

10. The system of claim 9, executing the processor-executable instructions further causes the processor to:
    receive a request to register the first application device with the first server device to permit the first application device to access the first server device and provide the first message to the client device via the first server device, wherein executing the processor-executable instructions, to provide the first identifier, causes the processor to provide the first identifier based on receiving the request to register the first application device with the first server device.

11. The system of claim 9, wherein executing the processor-executable instructions, to identify the set of policies, causes the processor to identify the set of policies based on information stored by the second server device associating the second identifier with the set of policies.

12. The system of claim 9, wherein the first and second application devices include a Machine-to-Machine device or an Application to Person device.

13. The system of claim 9, wherein executing the processor-executable instructions, to provide the set of policies, causes the processor to:
apply a spam filter to the message,
block the transmission of the message, or
generate a notification regarding the message.

14. The system of claim 9, wherein executing the processor-executable instructions further causes the processor to:
receive the second identifier each time a message is provided by the second application device,
wherein executing the processor-executable instructions, to identify the set of policies, causes the processor to identify the set of policies based on receiving the second identifier greater than a threshold number of times.

15. The system of claim 9, wherein the first server device is further to: receive, from a third server, a notification regarding the transmission of the message; and store or output the notification.

16. The system of claim 9, wherein executing the processor-executable instructions further causes the processor to:
determine that the first identifier is available to be assigned to the first application device; and
assign the first identifier to the first application device based on determining that the first identifier is available,
wherein executing the processor-executable instructions, to provide the first identifier, causes the processor to provide the identifier based on assigning the first identifier.

17. A system comprising: one or more server devices, associated with a first carrier network, the one or more server devices including processing logic to:
register first application devices that connect through the first carrier network with a shared directory server that is accessible by a plurality of carrier networks, the registration including assigning the registering application devices mobile directory numbers (MDNs) and associating the assigned MDNs, in the shared directory server, with an identification of the first carrier network and an indication application devices are machine-to-machine (M2M) or application-to-person (A2P) devices;
receive first messages from the first application devices;
determine whether the first messages require inter-carrier delivery;
forward the first messages to another one of the plurality of carrier networks when it is determined that the first messages require inter-carrier delivery, the forwarded first messages including the MDNs associated with the first application devices;
receive second messages, via a second carrier network of the plurality of carrier networks, from second application devices that connect through the second carrier network, the second messages each being associated with corresponding MDNs that were assigned by the second carrier network and registered with the shared directory server;
determine a set of policies to apply based information maintained by the shared directory server using the MDNs associated with the second messages; and
control delivery of the second messages to target client devices, associated with the first carrier network, based on the determined set of policies.

18. The system of claim 17, wherein one or more devices are further to:
receive, from the other one of the plurality of carrier networks and based on forwarding the first messages, a notification regarding the forwarding of the first messages; and
store or output the notification.

19. The system of claim 17, wherein when controlling delivery of the second messages, the one or more devices are further to:
apply a spam filter to the second messages,
block the transmission of the second messages, or
generate a notification regarding the second messages.

20. The system of claim 17, wherein the one or more devices are further to:
receive the corresponding MDNs each time the second messages are provided by the second application devices,
wherein when determining the set of policies, the one or more devices are further to determine the set of policies based on receiving the corresponding MDNs greater than a threshold number of times.

* * * * *